United States Patent
Wiecek et al.

(10) Patent No.: US 10,954,777 B2
(45) Date of Patent: Mar. 23, 2021

(54) FIXED-WAVELENGTH FIBER OPTIC TELEMETRY FOR CASING COLLAR LOCATOR SIGNALS

(71) Applicant: Halliburton Energy Services, Inc., Houston, TX (US)

(72) Inventors: Boguslaw Wiecek, Kingwood, TX (US); Thanh T. Tran, Houston, TX (US); William J. Schaecher, Houston, TX (US); Wei Zhang, Plano, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 181 days.

(21) Appl. No.: 15/769,391

(22) PCT Filed: Feb. 29, 2016

(86) PCT No.: PCT/US2016/020037
§ 371 (c)(1),
(2) Date: Apr. 19, 2018

(87) PCT Pub. No.: WO2017/151089
PCT Pub. Date: Sep. 8, 2017

(65) Prior Publication Data
US 2018/0371896 A1  Dec. 27, 2018

(51) Int. Cl.
*E21B 47/09* (2012.01)
*E21B 47/092* (2012.01)
*E21B 47/135* (2012.01)
*G02B 6/42* (2006.01)
*G01D 5/14* (2006.01)

(52) U.S. Cl.
CPC ............ *E21B 47/092* (2020.05); *E21B 47/09* (2013.01); *E21B 47/135* (2020.05); *G02B 6/4298* (2013.01); *G01D 5/14* (2013.01)

(58) Field of Classification Search
CPC .... E21B 47/09; E21B 47/0905; E21B 47/123; G02B 6/4298; G01D 5/14
See application file for complete search history.

(56) References Cited

U.S. PATENT DOCUMENTS

| | | | | |
|---|---|---|---|---|
| 2,985,822 | A * | 5/1961 | Georgi ................ | E21B 47/0905 324/221 |
| 4,199,660 | A * | 4/1980 | Dill ....................... | G06F 17/142 370/210 |
| 4,309,702 | A * | 1/1982 | Mibu ..................... | G01D 5/243 324/207.13 |
| 4,813,035 | A * | 3/1989 | Bishop ................... | H04J 4/005 370/307 |
| 5,140,318 | A * | 8/1992 | Stiner ................... | E21B 47/123 166/66 |

(Continued)

FOREIGN PATENT DOCUMENTS

WO  2013173404 A1  11/2013
WO  2017151089 A1  9/2017

*Primary Examiner* — David J Bolduc
(74) *Attorney, Agent, or Firm* — John Wustenberg; Parker Justiss, P.C.

(57) ABSTRACT

A downhole tool, in some embodiments, comprises a casing collar locator (CCL) to generate a signal that indicates the presence of a casing discontinuity; and a modulator, coupled to the CCL, to modulate fixed-wavelength light in a fiber optic cable based on said signal.

20 Claims, 5 Drawing Sheets

(56) References Cited

U.S. PATENT DOCUMENTS

| | | | | |
|---|---|---|---|---|
| 6,426,917 B1* | 7/2002 | Tabanou | | E21B 7/061 367/82 |
| 6,536,519 B1* | 3/2003 | Vaynshteyn | | E21B 47/0905 166/250.13 |
| 7,072,044 B2* | 7/2006 | Kringlebotn | | E21B 47/101 356/477 |
| 7,077,200 B1* | 7/2006 | Adnan | | E21B 47/0905 166/250.01 |
| 2002/0039465 A1* | 4/2002 | Skinner | | E21B 41/0085 385/15 |
| 2002/0171560 A1* | 11/2002 | Ciglenec | | E21B 47/122 340/853.1 |
| 2005/0034857 A1 | 2/2005 | Defretin et al. | | |
| 2005/0240351 A1* | 10/2005 | Gray | | E21B 47/0905 702/6 |
| 2005/0263281 A1* | 12/2005 | Lovell | | E21B 47/123 166/255.1 |
| 2006/0133711 A1* | 6/2006 | Vannuffelen | | E21B 47/123 385/1 |
| 2006/0152383 A1* | 7/2006 | Yamate | | E21B 47/123 340/853.1 |
| 2006/0157239 A1* | 7/2006 | Ramos | | E21B 47/123 166/254.2 |
| 2007/0126594 A1* | 6/2007 | Atkinson | | E21B 47/123 340/853.1 |
| 2008/0134775 A1* | 6/2008 | Pipchuk | | E21B 33/124 73/152.18 |
| 2008/0142212 A1* | 6/2008 | Hartog | | E21B 17/206 166/250.01 |
| 2008/0272931 A1* | 11/2008 | Auzerais | | E21B 47/123 340/854.7 |
| 2009/0038794 A1* | 2/2009 | Yamate | | E21B 47/123 166/254.2 |
| 2009/0250213 A1* | 10/2009 | Kalb | | E21B 47/0905 166/255.1 |
| 2010/0018703 A1 | 1/2010 | Lovell et al. | | |
| 2011/0139447 A1 | 6/2011 | Ramos et al. | | |
| 2013/0056197 A1* | 3/2013 | Maida | | E21B 47/123 166/250.01 |
| 2013/0056202 A1* | 3/2013 | Maida | | E21B 47/0905 166/255.1 |
| 2013/0140039 A1* | 6/2013 | Skinner | | E21B 47/123 166/378 |
| 2013/0249705 A1 | 9/2013 | Sharp et al. | | |
| 2014/0175271 A1* | 6/2014 | Samson | | E21B 49/08 250/264 |
| 2014/0216734 A1* | 8/2014 | Hupp | | E21B 47/09 166/255.1 |
| 2016/0208603 A1* | 7/2016 | Barfoot | | E21B 47/123 |
| 2016/0298955 A1* | 10/2016 | Perkins | | E21B 47/123 |
| 2016/0312587 A1* | 10/2016 | Montaron | | E21B 43/26 |
| 2017/0248008 A1* | 8/2017 | Brady | | G01V 3/38 |
| 2017/0248012 A1* | 8/2017 | Donderici | | E21B 49/00 |
| 2017/0328850 A1* | 11/2017 | Hay | | E21B 49/005 |
| 2018/0135971 A1* | 5/2018 | Han | | G01D 5/35335 |
| 2018/0245424 A1* | 8/2018 | Stokley | | E21B 47/123 |

\* cited by examiner

FIXED-WAVELENGTH FIBER OPTIC TELEMETRY FOR CASING COLLAR LOCATOR SIGNALS

CROSS-REFERENCE TO RELATED APPLICATION

This application is the National Stage of, and therefore claims the benefit of, International Application No. PCT/US2016/020037 filed on Feb. 29, 2016, entitled "FIXED-WAVELENGTH FIBER OPTIC TELEMETRY FOR CASING COLLAR LOCATOR SIGNALS," which was published in English under International Publication Number WO 2017/151089 on Sep. 8, 2017. The above application is commonly assigned with this National Stage application and is incorporated herein by reference in its entirety.

BACKGROUND

After a wellbore has been drilled, the wellbore is often cased by inserting lengths of steel pipe ("casing sections") connected end-to-end into the wellbore. Threaded exterior rings called couplings or collars are typically used to connect adjacent ends of the casing sections at casing joints. The result is a "casing string", i.e., a series of casing sections with connecting collars that extends from the surface to a bottom of the wellbore. The casing string is then cemented in place to complete the casing operation.

After a wellbore is cased, certain operations may be performed within the well using various tools (e.g., perforation operations using a perforating gun). Such operations require the ability to position a tool at a particular and known position in the well. One method for determining the position of the tool is to count the number of collars that the tool passes as it is lowered into the wellbore. As the length of each of the steel casing sections of the casing string is known, correctly counting a number of collars or joints traversed by a device as the device is lowered into a well enables an accurate determination of a depth or location of the tool in the well. Such counting can be accomplished with a casing collar locator ("CCL"), an instrument that may be attached to the tool and suspended in the wellbore. In certain applications, the detection signals from conventional casing collar locators may not be reliably communicated to the surface.

BRIEF DESCRIPTION OF THE DRAWINGS

Accordingly, there are disclosed in the accompanying drawings and in the following description techniques for modulating casing collar locator (CCL) signals onto fixed-wavelength fiber optic light. In the drawings.

DETAILED DESCRIPTION

Disclosed herein is a fiber optic telemetry system—usable in both slickline and wireline applications—that employs fixed-wavelength light to communicate casing collar locator (CCL) signals to surface equipment. The system includes a CCL having a magnet and coil configuration. When the CCL passes by a discontinuity in the casing, such as a casing collar, the magnetic field generated by the CCL is disturbed, causing the current in the coil to fluctuate. The coil couples to processing equipment (e.g., amplifiers, processors) that digitizes the analog CCL signal received from the coil. The processing equipment is connected to a fiber optic cable that is illuminated using any appropriate type of fixed-wavelength light source, such as a fixed-wavelength laser or a fixed-wavelength light emitting diode (LED). The processing equipment modulates the fiber optic light with the digitized CCL signal using any suitable modulation technique, such as pulse frequency modulation or phase modulation. In some embodiments, the CCL signal is not digitized and the fiber optic light is intensity-modulated (e.g., amplitude modulated) or phase modulated. In any case, the fiber optic cable transports the modulated light to the surface, where the light is demodulated and processed to reconstruct the original CCL signal.

The use of fixed-wavelength light reduces potential crosstalk relative to variable-wavelength systems and mitigates the wavelength filtering problems that arise in some such variable-wavelength systems. In addition, illuminating the fiber optic cable using fixed-wavelength light reduces the number of components necessary in the system. For instance, multiple light sources and/or multiple fiber optic cables are no longer required. Thus, both communication quality and cost efficiency improve.

Figure 1:
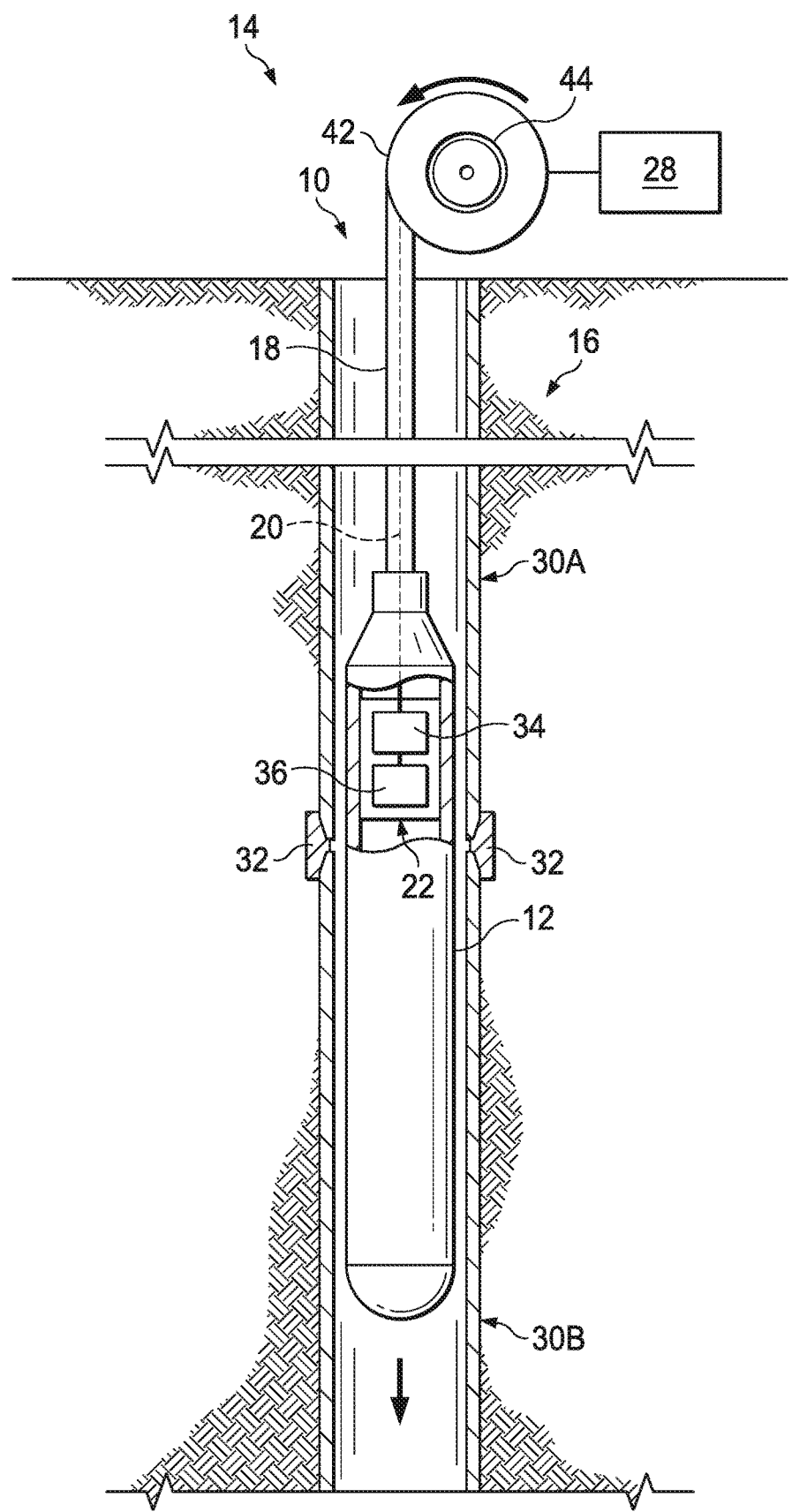
FIG. 1 is a schematic diagram of an illustrative slickline or wireline application.

FIG. 1 provides a side elevation view of a well 10 with an illustrative wireline tool system 14 including a sonde 12 suspended in the well 10 by a fiber optic cable 18 having one or more optical fiber(s) 20. The well 10 is cased with a casing string 16 having casing sections 30A and 30B connected end-to-end by a collar 32. As is typical, the casing sections 30A, 30B of the casing string 16 and the collars connecting the casing sections 30A, 30B (e.g., the collar 32) are made of steel, an iron alloy, and hence it exhibits a fairly high magnetic permeability and a relatively low magnetic reluctance. In other words, the casing string material conveys magnetic field lines much more readily than air and most other materials.

The illustrated sonde 12 houses a casing collar locator (CCL) tool 22. A surface unit 28 is coupled to the sonde 12 via the fiber optic cable 18 and configured to receive optical signals from the sonde 12 via the optical fiber(s) 20. In the embodiment of FIG. 1, the CCL tool 22 is configured to generate an electrical "location" signal when passing a collar of the casing string 16, to convert the electrical location signal into an optical location signal, and to transmit the optical location signal to the surface unit 28 via the optical fiber(s) 20 of the fiber optic cable 18.

In the embodiment of FIG. 1, the CCL tool 22 includes an optical interface 34 coupled to the optical fiber(s) 20, and a sensor 36 coupled to the optical interface 34. The sensor 36 produces an electrical signal in response to magnetic field changes attributable to passing collars (e.g., the collar 32) in the casing string 16. In some embodiments, the CCL tool 22 includes one or more permanent magnet(s) producing a magnetic field that changes when the CCL tool 22 passes a collar, and the sensor 36 includes a coil of wire (i.e., a coil) positioned in the magnetic field to detect such changes. As the CCL tool 22 passes a collar, the resultant change in the strength of the magnetic field passing through the coil causes an electrical voltage to be induced between the ends of the coil (in accordance with Faraday's Law of Induction). This induced electrical signal is the electrical "location" signal referred to above. In other embodiments, the sensor 36 may include, for example, a magnetometer or a Hall-effect sensor.

The optical interface 34 of the CCL tool 22 includes a light source controlled or modulated by the electrical signal received from the sensor 36, thereby producing an optical signal. The light source may include, for example, an incandescent lamp, an arc lamp, an LED, a laser, or a super-luminescent diode. The optical signal produced by the optical interface 34 includes an optical location signal produced in response to the electrical location signal. The optical interface 34 transmits the optical signal to the surface unit 28 via the optical fiber(s) 20 of the fiber optic cable 18. The surface unit 28 processes the optical signal received via the optical fiber(s) 20 to reconstruct the casing collar locator signal.

In at least some embodiments, the surface unit 28 includes a photodetector that receives the optical signal and converts it into an electrical signal (e.g., a voltage or a current) dependent on one or more characteristics of the optical signal. The photodetector may be or include, for example, a photodiode, a photoresistor, a charge-coupled device, or a photomultiplier tube. The contents of the surface unit 28 are described in greater detail below.

In the embodiment of FIG. 1, the fiber optic cable 18 preferably also includes armor to add mechanical strength and/or to protect the cable from shearing and abrasion. Some of the optical fiber(s) 20 may be used for power transmission, communication with other tools, and redundancy. The fiber optic cable 18 may, in some cases, also include electrical conductors if desired. The fiber optic cable 18 spools to and from a winch 42 as the sonde 12 is conveyed through the casing string 16. The reserve portion of the fiber optic cable 18 is wound around a drum of the winch 42, and the fiber optic cable 18 having been dispensed or unspooled from the drum supports the sonde 12 as it is conveyed through the casing string 16.

In the illustrated embodiment, the winch 42 includes an optical slip ring 44 that enables the drum of the winch 42 to rotate while making an optical connection between the optical fiber(s) 20 and corresponding fixed port(s) of the slip ring 44. The surface unit 28 is connected to the port(s) of the slip ring 44 to send and/or receive optical signals via the optical fiber(s) 20. In other embodiments, the winch 42 includes an electrical slip ring 44 to send and/or receive electrical signals from the surface unit 28 and an electro-optical interface that translates the signals from the optical fiber 20 for communication via the slip ring 44 and vice versa.

Figure 2:
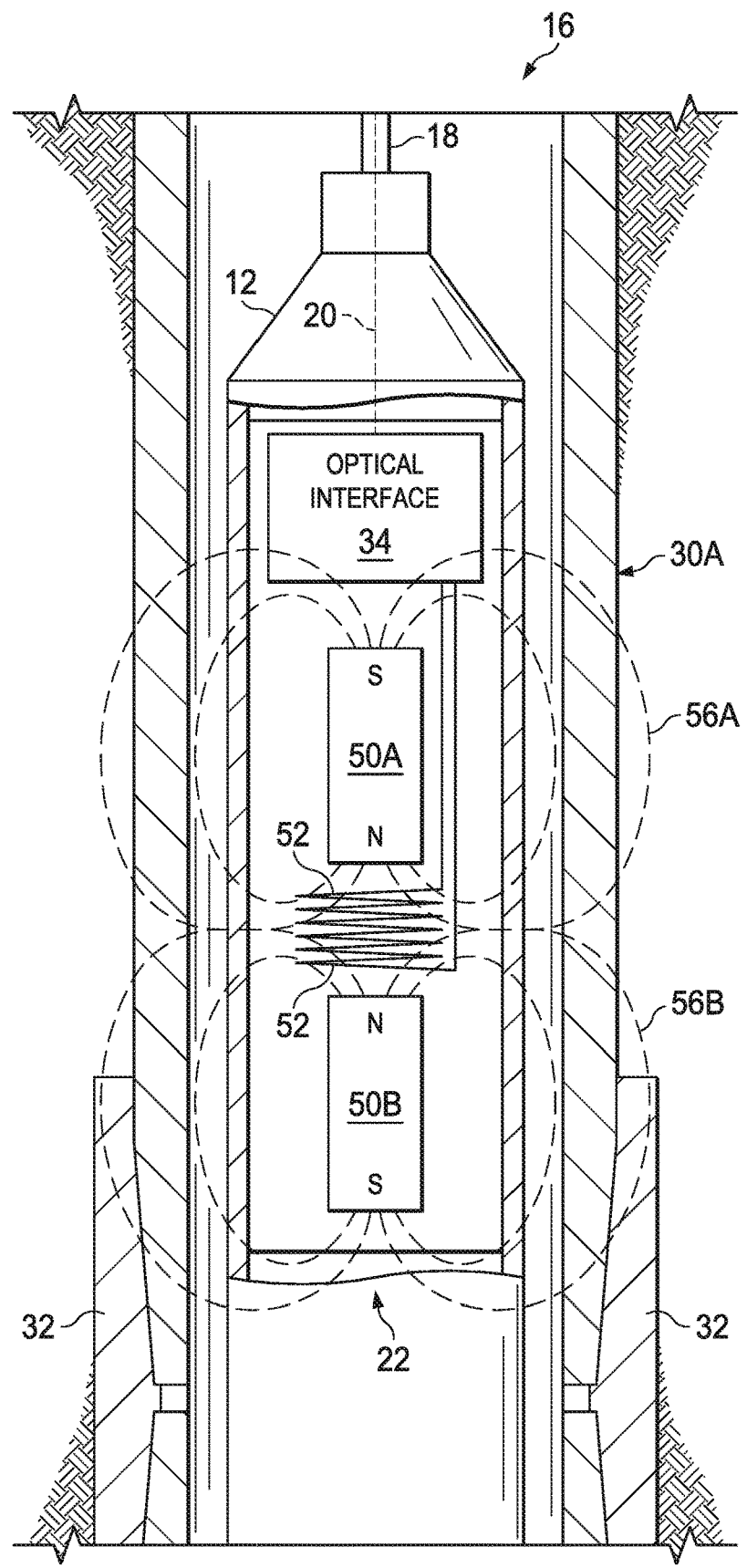
FIG. 2 is a schematic diagram of a CCL positioned within a sonde.

FIG. 2 provides a detailed version of an illustrative CCL tool embodiment. In the embodiment of FIG. 2, the CCL tool 22 includes a pair of opposed permanent magnets 50A and 50B and a wire coil 52 having multiple windings, the coil 52 serving as the sensor 36 of FIG. 1. The coil 52 is positioned between the magnets 50A and 50B to detect changes in the magnetic field produced by magnets 50A, 50B. In the embodiment of FIG. 2, each of the magnets 50A and 50B is cylindrical and has a central axis, but the scope of disclosure is not limited as such. The magnets 50A and 50B are positioned on opposite sides of the coil 52 such that their central axes are colinear, and the north magnetic poles of the magnets 50A and 50B are adjacent one another and the coil 52. A central axis of the coil 52 is colinear with the central axes of the magnets 50A and 50B. The coil 52 has two ends coupled to the optical interface 34.

The magnet 50A produces a magnetic field 56A that passes or "cuts" through the windings of the coil 52, and the magnet 50B produces a magnetic field 56B that also cuts through the windings of the coil 52. The magnet 50A and the adjacent walls of the casing string 16 form a first magnetic circuit through which most of the magnetic field 56A passes. Similarly, the magnetic field 56B passes through a second magnetic circuit including the magnet 50B and the adjacent walls of the casing string 16. The intensities of the magnetic fields 56A and 56B depend on the sums of the magnetic reluctances of the elements in each of the magnetic circuits.

Figure 3:
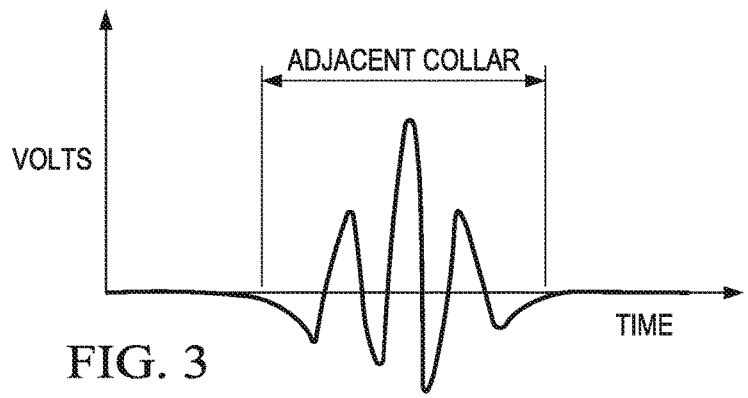
FIG. 3 is a graph demonstrating CCL signal variances when the CCL passes a discontinuity in the casing.

Any change in the intensities of the magnetic field 56A and/or the magnetic field 56B cutting through the coil 52 causes an electrical voltage to be induced between the two ends of the coil 52 in accordance with Faraday's Law of Induction. As the sonde 12 of FIG. 2 passes through a casing section of the casing string 16 (e.g., the casing section 30A), the intensities of the magnetic fields 56A and 56B cutting through the coil 52 remain substantially the same, and no appreciable electrical voltage is induced between the two ends of the coil 52. On the other hand, as the sonde 12 passes by a collar (e.g., the collar 32), the magnetic reluctance of the casing string 16 changes, causing the intensities of the magnetic fields 56A and 56B cutting through the coil 52 to change in turn, and an electrical voltage to be induced between the two ends of the coil 52. FIG. 3 is an illustrative graph of the electrical voltage that might be produced between the two ends of the coil 52 as the sonde 12 passes by collar 32. This signal is the location signal produced by the CCL tool 22 as described above.

Figure 4:
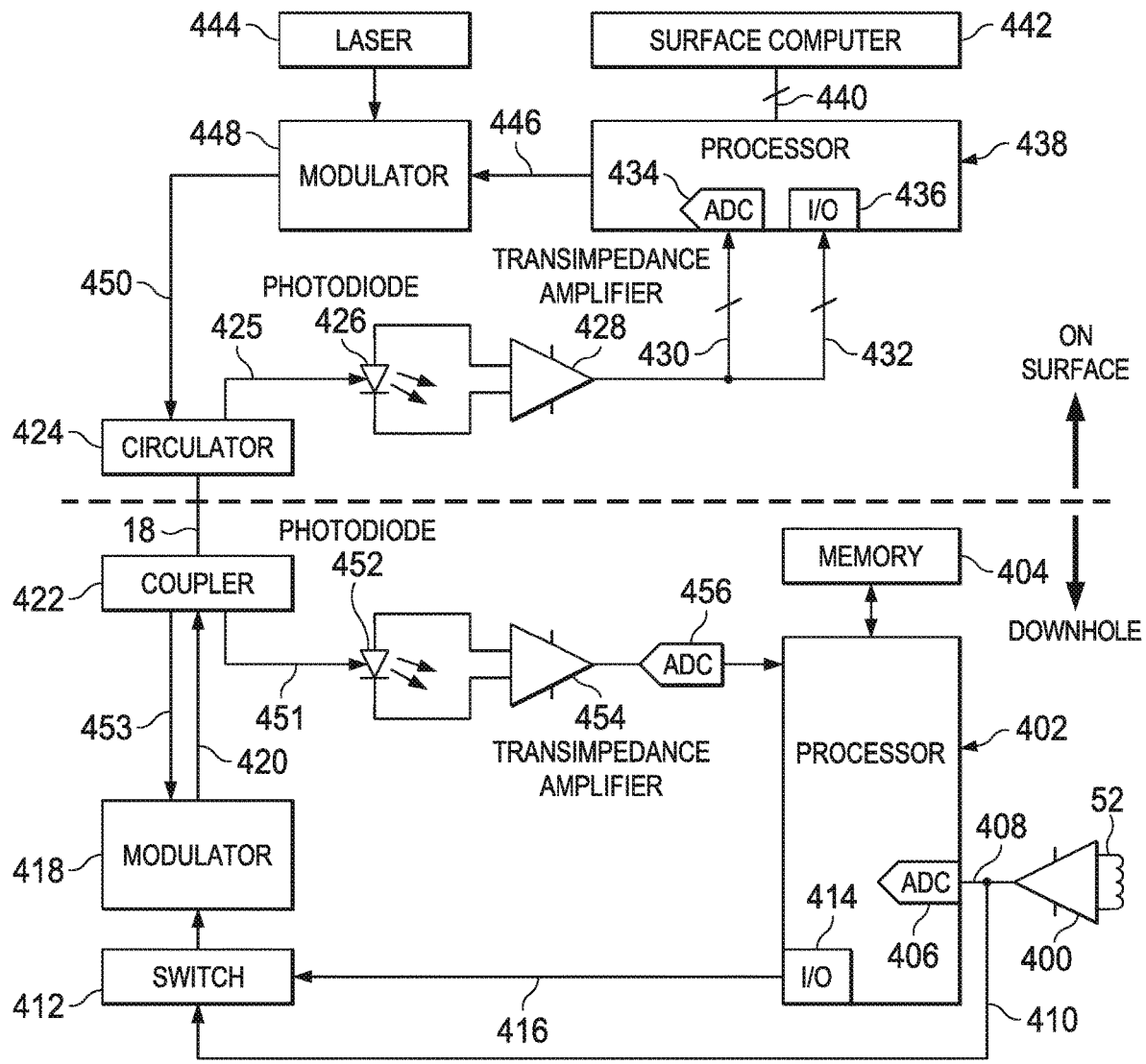
FIG. 4 is a block diagram of a fixed-wavelength fiber optic telemetry system to communicate CCL signals.

FIG. 4 is a block diagram of the optical telemetry system described herein. Specifically, the CCL coil 52 (FIG. 2) couples to an amplifier 400. The output of the amplifier 400 couples to analog-to-digital converter (ADC) 406 via connection 408. The ADC 406 forms part of a processor 402, which couples to a memory 404 (e.g., volatile or permanent memory) and further comprises an input/output (I/O) port 414. A switch 412 couples to the I/O port 414 and the amplifier 400 via connections 416 and 410, respectively. The output of the switch 412 couples to a modulator 418, the output of which couples to a coupler 422 via connection 420. The coupler 422 couples to the modulator 418 via connection 453 and to photodiode 452 via connection 451. The photodiode 452, in turn, couples to a transimpedance amplifier 454, and the amplifier 454 couples to an ADC 456. The ADC 456 couples to the processor 402. In at least some embodiments, the components 400, 402, 404, 406, 412, 414, 418, 422, 452, 454 and 456 form some or all of the optical interface 34 (FIG. 3).

The coupler 422 couples to circulator 424 (at the surface) via fiber optic cable 18. Circulator 424 couples to photodiode 426 via connection 425, and the photodiode 426 couples to a transimpedance amplifier 428. The amplifier 428, in turn, couples to an ADC 434 via connection 430 and to an I/O port 436 via connection 432. The port 436 and ADC 434 form part of a processor 438, which couples to a surface computer 442 via connection 440 and to a modulator 448 that is driven by a light source (e.g., a laser) 444. The modulator 448 couples to the circulator 424 via connection 450. In some embodiments, at least connections 450, 18, 453, 420, 451, and 425 are fiber optic cable connections.

In operation, the CCL signal from the coil 52 is amplified by the amplifier 400, and the amplified signal is provided to ADC 406 and to the switch 412. The CCL signal that is provided directly to the switch 412 via the connection 410 is an analog signal. The signal provided to the ADC 406 is also analog but is digitized and the processor 402 subsequently generates a spectrum-shifted, pulse frequency modulated signal at the I/O port 414. The analog signal on connection 410 and the digital signal on connection 416 are provided to switch 412. The switch 412 is preferably controlled by the processor 402. The switch 412 permits either the analog signal or the digital signal to pass to the modulator 418. The modulator 418 receives light from light source 444 on the connection 453. The modulator 418 modulates the light within the fiber optic cable 453 using any suitable modulation technique. For example, in some embodiments, the modulator 418 modulates the intensity (i.e., amplitude) of the light according to the analog CCL signal received on connection 410. In some embodiments, the modulator 418 modulates the light using pulse frequency modulation based on the digital signal received on the connection 416. In still other embodiments, the modulator 418 modulates the light using phase modulation based on the digital signal received on the connection 416. Other modulation techniques also are contemplated.

The modulated optical signal is provided to the coupler 422 via connection 420. The coupler 422 routes the modulated optical signal to the surface via the fiber optic cable 18. The circulator 424 routes the modulated optical signal to the photodiode 426, which converts the modulated optical signal to an electrical signal that is amplified by the amplifier 428. The resulting analog or digital signal is provided to the ADC 434 or the I/O port 436, as appropriate. The processor 438 then processes the resulting signal to reconstruct the original CCL signal and provides the reconstructed signal to a surface computer 442 to be used as desired. In this way, CCL signals are periodically or continuously communicated from the downhole CCL to the surface computer 442.

The aforementioned spectrum-shifted, pulse frequency encoding and modulation of the digitized CCL signal may be performed in any suitable manner. In at least some embodiments, the encoding and modulation are performed as follows. First, the amplitude of the analog CCL to be digitized is determined. The amplitude is assigned to one of a plurality of digital values. The number of possible digital values depends at least in part on the number of bits used to encode the digitized CCL signal. For example, for an 8-bit signal, there are 256 possible digital values, and each of these values is assigned to a different pulse frequency (shifted by a predetermined amount, e.g., 100 kHz). Thus, for instance, 100 kHz could represent the 8-bit signal "00000000," while 355 kHz could represent the 8-bit signal "11111111." A data structure containing the digital value-to-pulse frequency mapping is accessible to both processors 402, 438. To reconstruct the modulated signal, the processor 438 determines the pulse frequency of the optical signal and uses its data structure to determine the original analog CCL signal. Phase-modulated and amplitude-modulated signals may be similarly reconstructed.

In at least some embodiments, the aforementioned optical signal in the fiber optic cable is generated by a single light source 444 (e.g., a laser source) at the surface. In such embodiments, there are no other light sources illuminating the fiber optic cable. In some embodiments, the single light source may be located downhole—for example, in the sonde 12, and in such embodiments, there are no other light sources illuminating the fiber optic cable. In either case, the light generated by the light source preferably has a fixed wavelength, which is what gives rise to the need for only a single light source. The specific wavelength used may be selected as desired and as may be suitable. The light generated by the light source 444 is provided to modulator 448, which modulates the light with data signals that are to be transmitted downhole. Such data signals are generated by the processor 438 and/or by the surface computer 442 and are provided to the modulator 448 via connection 446. The modulator 448 may use any suitable modulation technique, such as intensity (i.e., amplitude) modulation, phase modulation or pulse-frequency modulation, as described above. Other modulation techniques are contemplated.

The modulated signal is provided to the circulator 424 via connection 450. The circulator 424 directs light from the modulator 448 to the fiber optic cable 18. The coupler 422 splits the single optical channel in the fiber optic cable 18 into three separate channels (i.e., on connections 451-453). The coupler 422 routes the incoming signal to the photodiode 452, where the modulated optical signal is converted into an electrical signal that is amplified by the transimpedance amplifier 454 and converted to digital format by ADC 456. The digital signal is then provided to the processor 402 to be used as desired.

Figure 5:
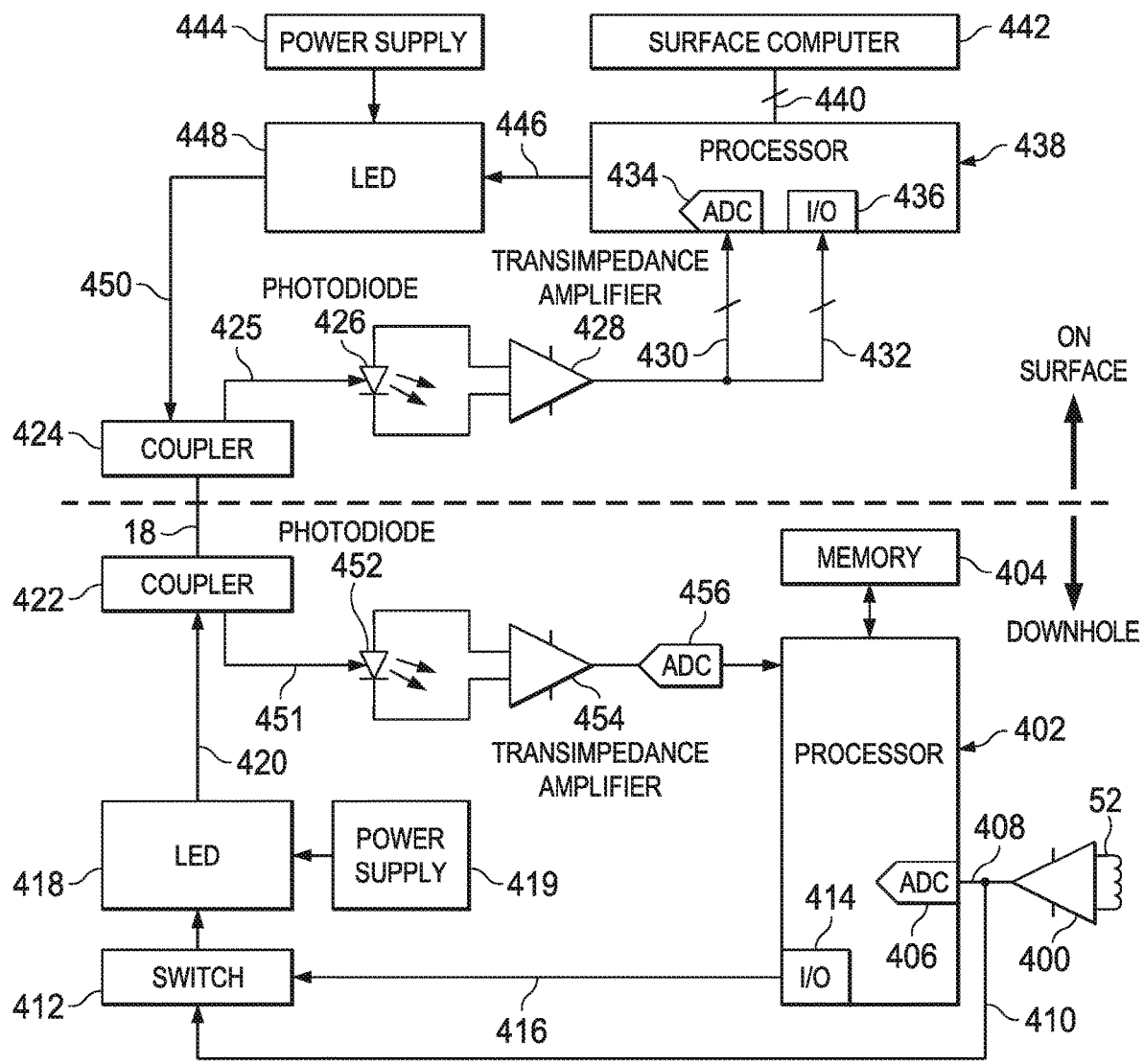
FIG. 5 is another block diagram of a fixed-wavelength fiber optic telemetry system to communicate CCL signals.

FIG. 5 is another block diagram of the optical telemetry system described herein. The embodiment depicted in FIG. 5 is similar to that shown in FIG. 4, but FIG. 5 depicts two light emitting diodes (LEDs) 548, 518. The LED 548 is positioned at the surface, and LED 518 is positioned downhole. The LED 548 is driven by a power supply 544, and the LED 518 is driven by a power supply 519. The circulator 424 is replaced by a coupler 524. In operation, the processor 502 uses the photodiode 552 to monitor the status of the LED 548 (i.e., whether the LED 548 is on or off), and the processor 538 uses the photodiode 526 to monitor the status of the LED 518 (i.e., whether the LED 518 is on or off). When the processor 502 determines that the LED 548 is off, it uses the LED 518 to transmit data to the surface via the fiber optic cable 18. Specifically, the processor 502 modifies the optical output of the LED 518 so that it is modulated to include the CCL signal from coil 52. The processor 502 may control the LED 518 in this manner to accomplish pulse frequency modulation, phase modulation or amplitude modulation. Other modulation techniques also are contemplated. While LED 518 is illuminating the fiber optic cable 18, the processor 538 uses photodiode 526 to detect such illumination and thus refrains from activating the LED 548. When the LED 518 ceases to illuminate the fiber optic cable 18 (e.g., for a predetermined length of time so as to ensure that the LED 518 has completed its telemetry), the processor 538 causes the LED 548 to transmit data downhole in the same or similar manner as the processor 502 and LED 518. The couplers 522, 524 serve to route the incoming and outgoing optical signals.

Figure 6:
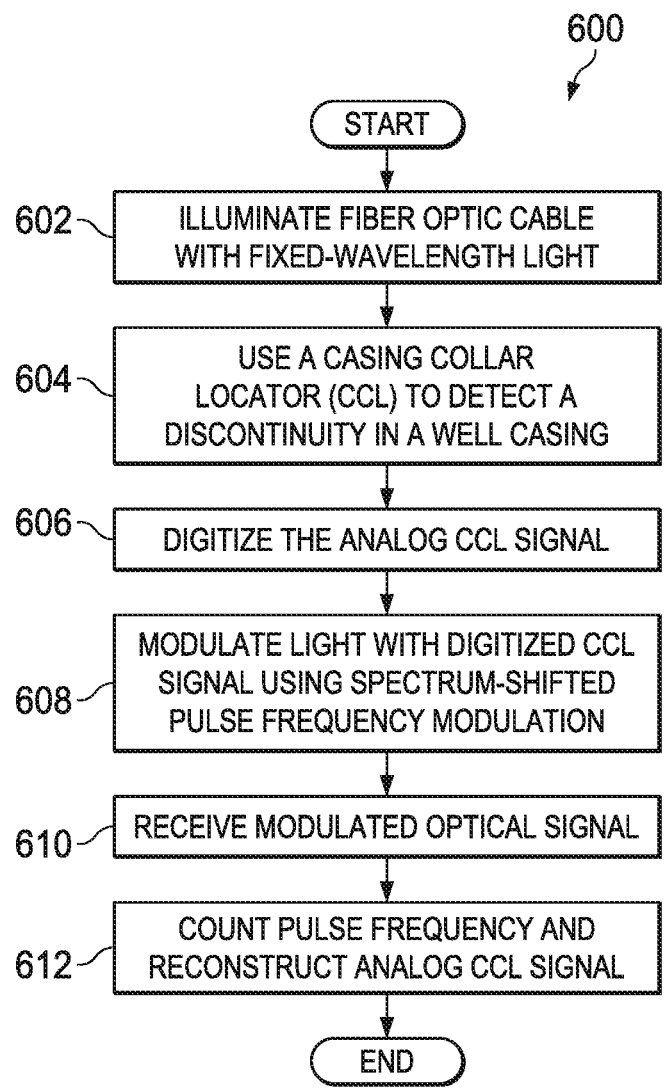
FIG. 6 is a flow diagram of a method for communicating CCL signals via fixed-wavelength fiber optic telemetry.

FIG. 6 is a flow diagram of a method 600 for communicating CCL signals via fixed-wavelength fiber optic telemetry. The method 600 begins by illuminating a fiber optic cable with fixed-wavelength light (step 602). As explained above, any suitable type of light source may be used, including lasers and LEDs. The method 600 next comprises using a CCL to detect a discontinuity—such as a casing collar—in a well casing (step 604). The method 600 can be performed irrespective of the actual detection of such a discontinuity, so long as a signal is available from the CCL. The method 600 also includes digitizing the analog CCL signal (step 606) and modulating light within the fiber optic cable with the digitized CCL signal using spectrum-shifted pulse frequency modulation (step 608). Other types of modulation also may be used, as previously explained. Also as explained, in some embodiments, the CCL signal is kept in an analog state and is modulated accordingly. The method 600 next comprises receiving the modulated optical signal at the surface (step 610) and de-modulating the optical signal to reconstruct the analog CCL signal (step 612). In the case of pulse-frequency modulation, the de-modulation portion of step 612 may include counting the pulse frequency of the optical signal to reconstruct the original analog CCL signal. The reconstructed CCL signal may then be used as desired. The method 600 may be modified as desired, including by adding, deleting or rearranging one or more steps.

Numerous other variations and modifications will become apparent to those skilled in the art once the above disclosure is fully appreciated. It is intended that the following claims be interpreted to embrace all such variations, modifications and equivalents. In addition, the term "or" should be interpreted in an inclusive sense. Further, the term "couple," as used herein, implies a direct or indirect connection between two or more components.

At least some embodiments are directed to a downhole tool, comprising: a casing collar locator (CCL) to generate a signal that indicates the presence of a casing discontinuity; and a modulator, coupled to the CCL, to modulate fixed-wavelength light in a fiber optic cable based on said signal. Such embodiments may be supplemented using one or more of the following concepts, in any order and in any combination: wherein the fiber optic cable receives light from no other light sources; wherein the modulator performs said modulation using pulse-frequency modulation or phase modulation; wherein the pulse frequency of said light represents an amplitude of said signal; wherein the pulse frequency is spectrum shifted prior to said modulation; wherein the modulator modulates an intensity of said light based on said signal; wherein the tool is a slickline tool; wherein said fixed-wavelength light is laser light; further comprising a light emitting diode (LED) that illuminates the fiber optic cable only when the fiber optic cable is not being illuminated by another light source; wherein the tool does not include a light source to illuminate the fiber optic cable.

At least some embodiments are directed to a system, comprising: a surface light-emitting diode (LED); a fiber optic cable coupled to the surface LED; a downhole LED, coupled to the fiber optic cable, to provide fixed-wavelength light into the fiber optic cable; a casing collar locator (CCL) positioned downhole; and a downhole modulator, coupled to the CCL and the downhole LED, to modulate said light provided into the fiber optic cable by the downhole LED based on signals generated by the CCL, wherein the downhole modulator modulates said light only when the surface LED is not illuminating the fiber optic cable. Such embodiments may be supplemented using one or more of the following concepts, in any order and in any combination: further comprising a sonde housing downhole LED, CCL, and downhole modulator, said sonde deployed within the system using a slickline or wireline; wherein the downhole modulator modulates said light using a technique selected from the group consisting of: pulse frequency modulation; phase modulation; and amplitude modulation; wherein said pulse frequency modulation comprises spectrum-shifted pulse frequency modulation; wherein said modulation represents amplitudes of said signals generated by the CCL.

At least some embodiments are directed to a method, comprising: providing fixed-wavelength light into a fiber optic cable; using a casing collar locator (CCL) to detect a discontinuity in a well casing; and modulating said fixed-wavelength light in accordance with a signal produced by the CCL. Such embodiments may be supplemented using one or more of the following concepts, in any order and in any combination: wherein said modulating comprises using spectrum shifted pulse frequency modulation; further comprising modulating the fixed-wavelength light at the surface based on another signal, wherein said modulation based on the CCL signal and said modulation based on said another signal are performed using different ones of amplitude modulation and phase modulation; wherein said providing the fixed-wavelength light comprises using a single laser light source at the surface; further comprising using two light emitting diodes (LEDs) to provide said fixed-wavelength light into the fiber optic cable, wherein each of said LEDs illuminates the fiber optic cable only when the other LED is not illuminating the fiber optic cable.

We claim:
1. A downhole tool, comprising:
   a casing collar locator (CCL) to generate a signal that indicates a presence of a casing discontinuity; and
   an optical interface, coupled to the CCL, configured to modulate fixed-wavelength light in a fiber optic cable using a pulse-frequency modulation, wherein the modulation includes determining an amplitude of the signal and assigning the amplitude one of digital values, each of which corresponds to a different pulse frequency.

2. The tool of claim 1, wherein the fiber optic cable receives the light from a single light source.

3. The tool of claim 1, wherein the optical interface is further configured to modulate the light using a phase modulation.

4. The tool of claim 1, wherein the pulse frequency modulation includes a spectrum-shifted pulse frequency modulation.

5. The tool of claim 1, wherein a pulse frequency of the light is spectrum shifted prior to the pulse-frequency modulation.

6. The tool of claim 1, wherein the optical interface modulates an intensity of the light based on the signal.

7. The tool of claim 1, wherein the tool is a slickline tool.

8. The tool of claim 1, wherein the fixed-wavelength light is laser light.

9. The tool of claim 1, further comprising a photodiode that monitors a status of a surface light source, and a light emitting diode (LED) that illuminates the fiber optic cable only when the photodiode determines that the surface light source is off.

10. The tool of claim 1, wherein the tool does not include a light source to illuminate the fiber optic cable.

11. A system, comprising:
    a surface light source;
    a fiber optic cable coupled to the surface light source;
    a casing collar locator (CCL) positioned downhole and configured to generate signal that indicates a presence of a casing discontinuity; and
    a downhole optical interface, coupled to the CCL and the surface light source via the fiber optic cable, configured to modulate fixed-wavelength light provided into the fiber optic cable using a pulse-frequency modulation, wherein the modulation includes determining an amplitude of the signal and assigning the amplitude one of digital values, each of which corresponds to a different pulse frequency.

12. The system of claim 11, further comprising a sonde that encloses the CCL, and the downhole optical interface, the sonde deployed within the system using a slickline or wireline.

13. The system of claim 11, wherein the downhole optical interface is further configured to modulate the light using a technique selected from the group consisting of: phase modulation; and amplitude modulation.

14. The system of claim 11, wherein the pulse frequency modulation comprises spectrum-shifted pulse frequency modulation.

15. The system of claim 11, wherein the modulation represents the amplitude of the signal generated by the CCL.

16. A method, comprising:
    receiving fixed-wavelength light from surface via a fiber optic cable;
    generating a signal that indicates a presence of a discontinuity in a well casing; and
    modulating the fixed-wavelength light received from the surface using a pulse-frequency modulation, wherein the modulation includes determining an amplitude of the signal and assigning the amplitude one of digital values, each of which corresponds to a different pulse frequency.

17. The method of claim 16, wherein said modulating comprises using spectrum shifted pulse frequency modulation.

18. The method of claim 16, further comprising modulating the fixed-wavelength light at the surface based on another signal, wherein the modulation based on the signal and the modulation based on the another signal are performed using different ones of amplitude modulation and phase modulation.

19. The method of claim 16, wherein said receiving the fixed-wavelength light comprises using a single laser light source at the surface.

20. The method of claim 16, further comprising using two light emitting diodes (LEDs) to provide the fixed-wavelength light into the fiber optic cable, wherein each of the LEDs illuminates the fiber optic cable only when the other LED is not illuminating the fiber optic cable.

* * * * *